US011622397B2

(12) United States Patent
Sirotkin et al.

(10) Patent No.: US 11,622,397 B2
(45) Date of Patent: Apr. 4, 2023

(54) ENHANCING USER PLANE CONTEXTS MANAGEMENT IN NEW RADIO (NR)

(71) Applicant: Apple Inc., Cupertino, CA (US)

(72) Inventors: Alexander Sirotkin, Hod Hasharon (IL); Jaemin Han, Portland, OR (US); Feng Yang, Beijing (CN)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 17/250,568

(22) PCT Filed: Aug. 6, 2019

(86) PCT No.: PCT/US2019/045366
§ 371 (c)(1),
(2) Date: Feb. 3, 2021

(87) PCT Pub. No.: WO2020/033451
PCT Pub. Date: Feb. 13, 2020

(65) Prior Publication Data
US 2021/0176802 A1 Jun. 10, 2021

Related U.S. Application Data

(60) Provisional application No. 62/717,101, filed on Aug. 10, 2018.

(51) Int. Cl.
*H04L 12/801* (2013.01)
*H04W 76/12* (2018.01)
(Continued)

(52) U.S. Cl.
CPC .......... *H04W 76/12* (2018.02); *H04L 1/1864* (2013.01); *H04W 36/0033* (2013.01); *H04W 76/22* (2018.02); *H04W 76/27* (2018.02)

(58) Field of Classification Search
None
See application file for complete search history.

(56) References Cited

U.S. PATENT DOCUMENTS

| 10,952,265 B2* | 3/2021 | Yang ................ H04W 76/12 |
| 11,190,980 B1* | 11/2021 | Kwok ............... H04W 80/02 |

(Continued)

FOREIGN PATENT DOCUMENTS

| WO | 2018-009340 | 1/2018 | |
| WO | WO-2018009340 A1 * | 1/2018 | ............ H04W 76/10 |

OTHER PUBLICATIONS

Intel Corporation, "General Principles of Separation of CP and UP for High Level Functional Split", R3-172285,3GPP TSG RAN WG3, Jun. 2017, pp. 1-5.

(Continued)

*Primary Examiner* — Sithu Ko
(74) *Attorney, Agent, or Firm* — Fay Kaplun & Marcin, LLP (57) ABSTRACT

An apparatus of a next generation NodeB (gNB) comprises one or more baseband processors to interconnect a gNB Central Unit control-plane entity (gNB-CU-CP) with a gNB Central Unit user-plane entity (gNB-CU-UP) via an E1 control plane interface and a gNB Distributed Unit (gNB-DU) via an F1 control plane interface. Rather than relying on multiple class-1 procedures initiated by gNB-CU-CP toward gNB-CU-UP and gNB-DU, the one or more baseband processors are configured to establish or modify a bearer context and to communicate data transport tunneling and/or packet data convergence protocol (PDCP) preservation status information for a specific user equipment (UE), utilizing the direct F1 user plane interface between gNB-DU and (Continued)

gNB-CU-UP to avoid relaying delay. The gNB can include a memory to store the bearer context and data transport tunneling information.

20 Claims, 6 Drawing Sheets (51) Int. Cl.
*H04W 76/22* (2018.01)
*H04W 76/27* (2018.01)
*H04L 1/1829* (2023.01)
*H04W 36/00* (2009.01)

(56) References Cited

U.S. PATENT DOCUMENTS

| | | | | |
|---|---|---|---|---|
| 11,197,332 | B2* | 12/2021 | Sirotkin | H04W 76/12 |
| 11,412,554 | B2* | 8/2022 | Yang | H04W 76/10 |
| 11,483,890 | B2* | 10/2022 | Jonsson | H04W 76/20 |
| 2013/0294403 | A1 | 11/2013 | Srinivasan | |
| 2019/0373666 | A1* | 12/2019 | Khan | H04W 76/27 |
| 2021/0185755 | A1* | 6/2021 | Kim | H04W 28/06 |
| 2021/0306848 | A1* | 9/2021 | Chen | H04W 76/18 |

OTHER PUBLICATIONS

Ericsson et al., "Separation of CP and UP", R3-171725, 3GPP TSG RAN WG3 #96 , May 2017, pp. 1-3.
3GPP; TSG RAN: NG-RAN; "Architecture Description (Release 15)", 3GPP TS 38.401, Jun. 2018.

* cited by examiner

ENHANCING USER PLANE CONTEXTS MANAGEMENT IN NEW RADIO (NR)

CROSS-REFERENCE TO RELATED APPLICATIONS

The present application claims the benefit of U.S. Provisional Application No. 62/717,101 filed Aug. 10, 2018. Said Application No. 62/717,101 is hereby incorporated herein by reference in its entirety.

BACKGROUND

In the Fifth Generation (5G) new radio (NR) standard, the next generation evolved Node B Central Unit (gNB-CU) became further separated into control-plane entity (gNB-CU-CP) and user-plane entity (gNB-CU-UP) inter-connected via an E1 interface. Together with a gNB Distributed Unit (gNB-DU) which is connected to a gNB-CU via an F1 interface (more specifically, F1-C or F1-AP, control plane interface of F1 toward a gNB-CU-CP, and F1-U, user plane interface of F1 toward a gNB-CU-UP), setting up or modifying user plane contexts in a gNB now involves multiples entities, a gNB-DU and a gNB-CU-UP under the control of a gNB-CU-CP.

According to the latest version of the Third Generation Partnership Project (3GPP) Technical Standard (TS) 38.401, setting up or modifying user plane contexts in either gNB-CU-UP or gNB-DU are done via a class-1 (request/response) procedure initiated by gNB-CU-CP. The gNB-CU-CP first communicates with gNB-CU-UP to establish bearer contexts and to allocate UL F1-U TNL addresses, then with gNB-DU to give those allocated UL F1-U TNL addresses, for the delivery of UL packets from gNB-DU to gNB-CU-UP, and also to allocate lower-layer resources and DL F1-U TNL addresses. The procedure is then completed when gNB-CU-CP further gives those DL F1-U TNL addresses allocated by gNB-DU to the gNB-CU-UP for the delivery of DL packets toward gNB-DU).

This approach can ensure the control plane anchor, i.e., gNB-CU-CP, for correct establishment or modification of the user-plane contexts in each and every step, but it is prone to a potential delay because information required between gNB-DU and gNB-CU-UP is relayed via gNB-CU-CP. For example, DL F1-U TNL addresses allocated by gNB-DU, which are required by gNB-CU-UP to initiate DL data delivery toward the user equipment (UE), are relayed over gNB-CU-CP. Any delay, for example in gNB-DU's set-up response or gNB-CU-CP's modification request, could hold up downlink (DL) data delivery toward the UE. Therefore, rather than relying on multiple class-1 actions initiated by gNB-CU-CP, it is worth considering alternative mechanisms that can utilize the direct F1-U interface between gNB-DU and gNB-CU-UP to avoid potential relaying delay. Following this principle, alternative mechanisms on some overall procedures defined in 3GPP TS 38.401 that could be enhanced.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

Figure 1:
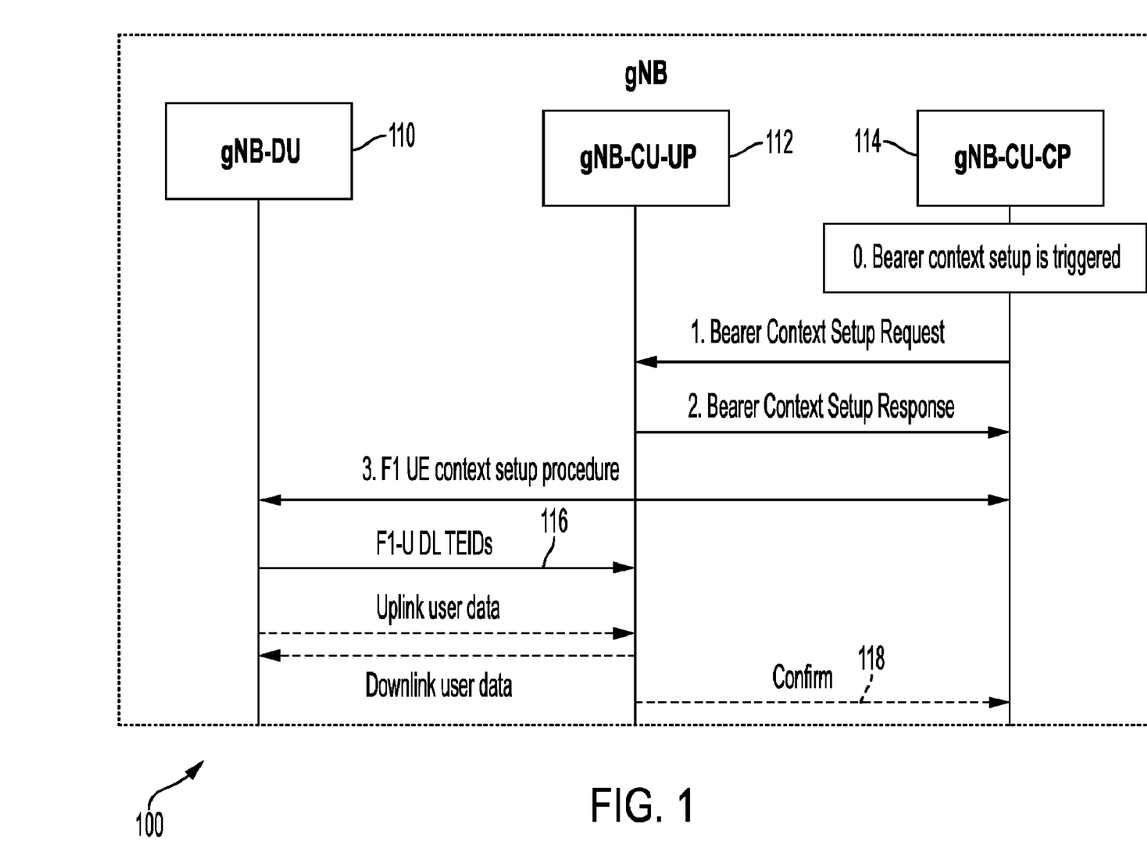
FIG. 1 is a diagram of a bearer context step in accordance with one or more embodiments.

Referring now to FIG. 1, a diagram of a bearer context step procedure in accordance with one or more embodiments will be discussed. As shown in FIG. 1, the modified bearer context setup procedure 100 can involve transporting downlink (DL) F1-U Transport Network Layer (TNL) allocated by the NR Node B distributed unit (gNB-DU) 110 directly to the gNB Centralized Unit User Plane (gNB-CU-UP) 112 via the F1-U interface. This approach can replace not only a complicated Bearer Context Modification procedure by a simpler UP frame for the delivery of DL F1-U TNL, but can also achieve a faster DL data delivery toward the user equipment (UE). In the original bearer context setup procedure described in Section 8.9.2 of 3GPP TS 38.401 (see FIG. 8.9.2-1), DL F1-U TNL allocated by the gNB-DU 110 during (operation 3) is relayed via the gNB-CU control plane (gNB-CU-CP) 114 (operation), which could potentially delay DL data delivery toward the UE.

It is noted, however, that the gNB-DU 110 already knows the UL F1-U TNL addresses allocated by gNB-CU-UP 112 (operation 3), for which it can send an F1-U frame for the successfully established or modified bearers. TNL addresses consists of the GPRS Tunneling Protocol Tunnel Endpoint Identifier (GTP-TEID) and Internet Protocol (IP) address of the associated entity. As a source and a destination IP addresses are exposed within an IP packet header, what the gNB-DU 110 needs to provide is the GTP-TEID allocated for DL F1-U in order for the gNB-CU-UP 112 to send DL packets. As show in the modified procedure 100 shown in FIG. 1, if transported directly over the F1-U interface at operation 116 as soon as bearers to be setup or modified are successfully accomplished at the gNB-DU 110, not only it can effectively replace the follow-up Bearer Context Modification procedure initiated by gNB-CU-CP (operation 4 and operation 5) but also achieves a faster DL data delivery toward the UE without any potential delay while the DL F1-U TNL being relayed via the gNB-CU-CP 114.

As a result, the operation 3 response from the gNB-DU 110 to the gNB-CU-CP 114 (F1 UE Context Setup Response) can be left intact, providing control-plane responses back to the gNB-CU-CP 114 as usual, but only the DL F1-U TNL address, more specifically, GTP-TEID allocated for DL F1-U required for DL packet delivery by the gNB-CU-UP 112, is given directly over F1-U at operation 116 as shown in FIG. 1. The modified procedure 100 shown in FIG. 1 can be realized in many ways. A new F1-U frame can be defined or an existing Dynamic Delegation Discovery Service (DDDS) frame can be enhanced to transport GTP-TEIDs allocated by the gNB-DU 110. A new E1-AP class-2 procedure can be defined from the gNB-CU-UP 112 to inform the gNB-CU-CP 114 at operation 118 for the successful provision of DL F1-U TNL addresses. Furthermore, enhanced stage-2 description on 3GPP TS 38.401, for example DDDS including DL F1-U GTP-TEID, can be initiated toward the gNB-CU-UP 112 once lower layer resources of a bearer to be set-up or modified are successfully accomplished at the gNB-DU 110. Upon receiving this initial DDDS from the gNB-DU 110, the gNB-CU-UP 112 can decode DL F1-U GTP-TEID and know where to send DL packets.

Figure 2:
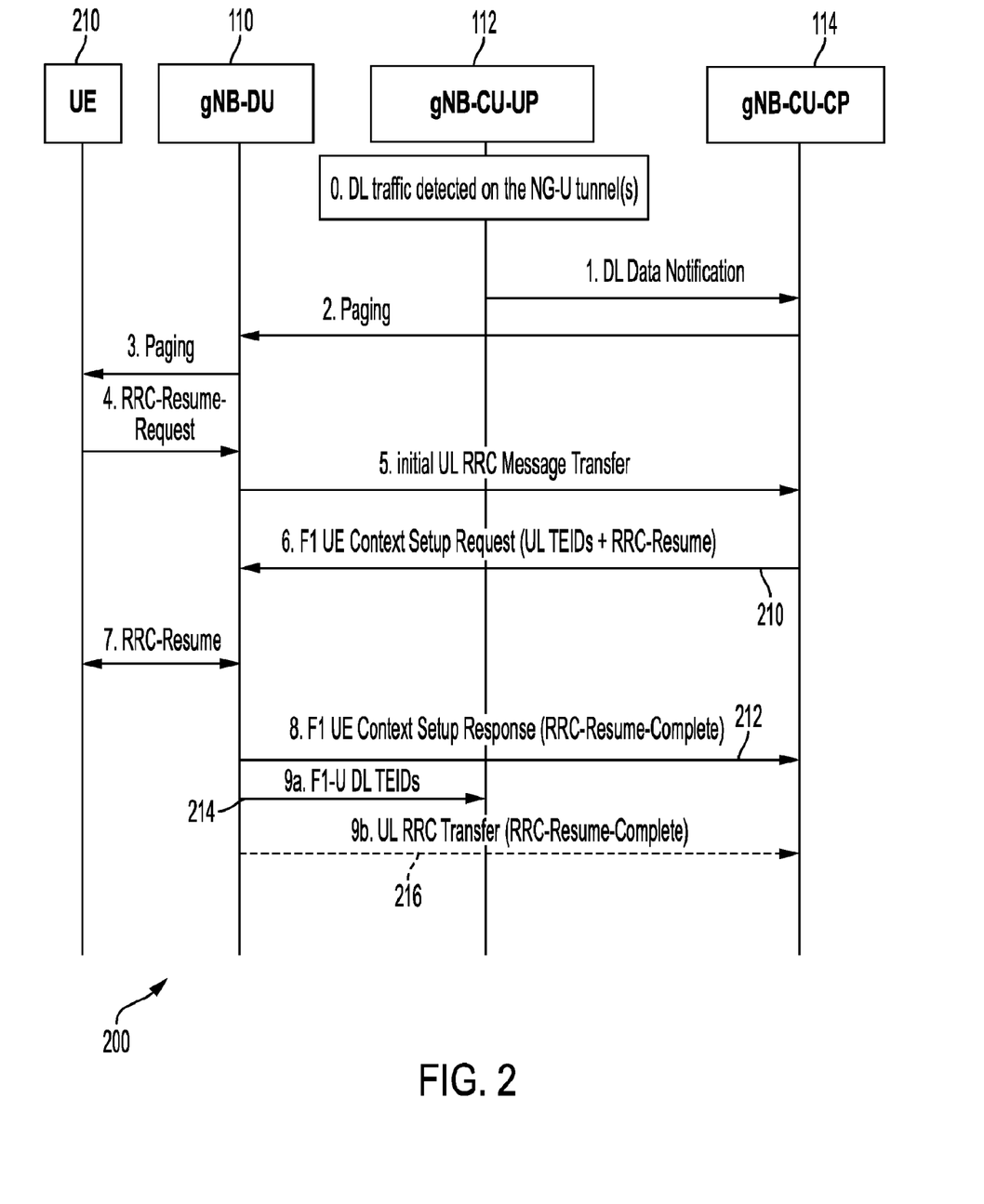
FIG. 2 is a diagram of an RRC Inactive state to RRC Connected state transition in accordance with one or more embodiments.

Referring now to FIG. 2, a diagram of an RRC Inactive state to RRC Connected state transition in accordance with one or more embodiments will be discussed. FIG. 2 shows a modified transition procedure 200. In the original transition procedure described in Section 8.9.6 of 3GPP TS 38.401 (see FIG. 8.9.6.2-1), during radio resource control (RRC) Inactive to Connected transition, DL F1-U TNL addresses are provided to the gNB-CU-UP 112 with RRC resume indication. Once the RRC-Resume operation is successfully configured to the UE 210 via the gNB-DU 110, the gNB-DU 110 can use the provided F1-U UL TNL to propagate the allocated F1-U DL TNL addresses to the gNB-CU-UP 112 directly over the F1-U interface for which the gNB-CU-UP 112 is able to know the resumption of the suspended bearers. This can replace the Bearer Context Modification procedure with a resume indication initiated by the gNB-CU-CP 114 in the original transition procedure.

Moreover, RRC-Resume and RRC-Resume-Complete messages (which are communicated with the UE over SRB1) do not have to be transferred between the gNB-DU and the gNB-CU-CP by separate procedures. They can be incorporated into the single existing procedure of the F1AP UE Context Setup Request/Response messages via the contained RRC Container Information Element (IE), where the gNB-DU 110 is currently specified to transmit, over SRB1, any RRC message included in that RRC Container IE.

The resulting flow is the modified transition procedure 200 of FIG. 2, where the gNB-CU-CP 114 triggers the F1 AP UE Context Setup onto the gNB-DU 110 together with RRC-Resume message at operation 210 (operation 6), then the gNB-DU 110 performs RRC reconfiguration over SRB1 (operation 7) once lower-layers are successfully established, and then the result of RRC reconfiguration from the UE 210 (i.e. RRC-Resume-Complete over SRB1) is responded back to the gNB-CU-CP 114 together with the result of F1AP UE Context Setup in the gNB-CU-UP 112 at operation 212 (operation 8). Alternatively, the RRC-Resume-Complete message can be transported later to the gNB-CU-CP 114 via F1AP UL RRC Transfer operation 216 (step 9b) after sending F1-U DL TEIDs at operation 214, if timely response is required for F1AP UE Context Setup procedure. The modified transition procedure 200 can have a similar stage-3 impacts as the modified bearer context setup procedure 100 with the above enhanced stage-2 description in FIG. 2.

Figure 3:
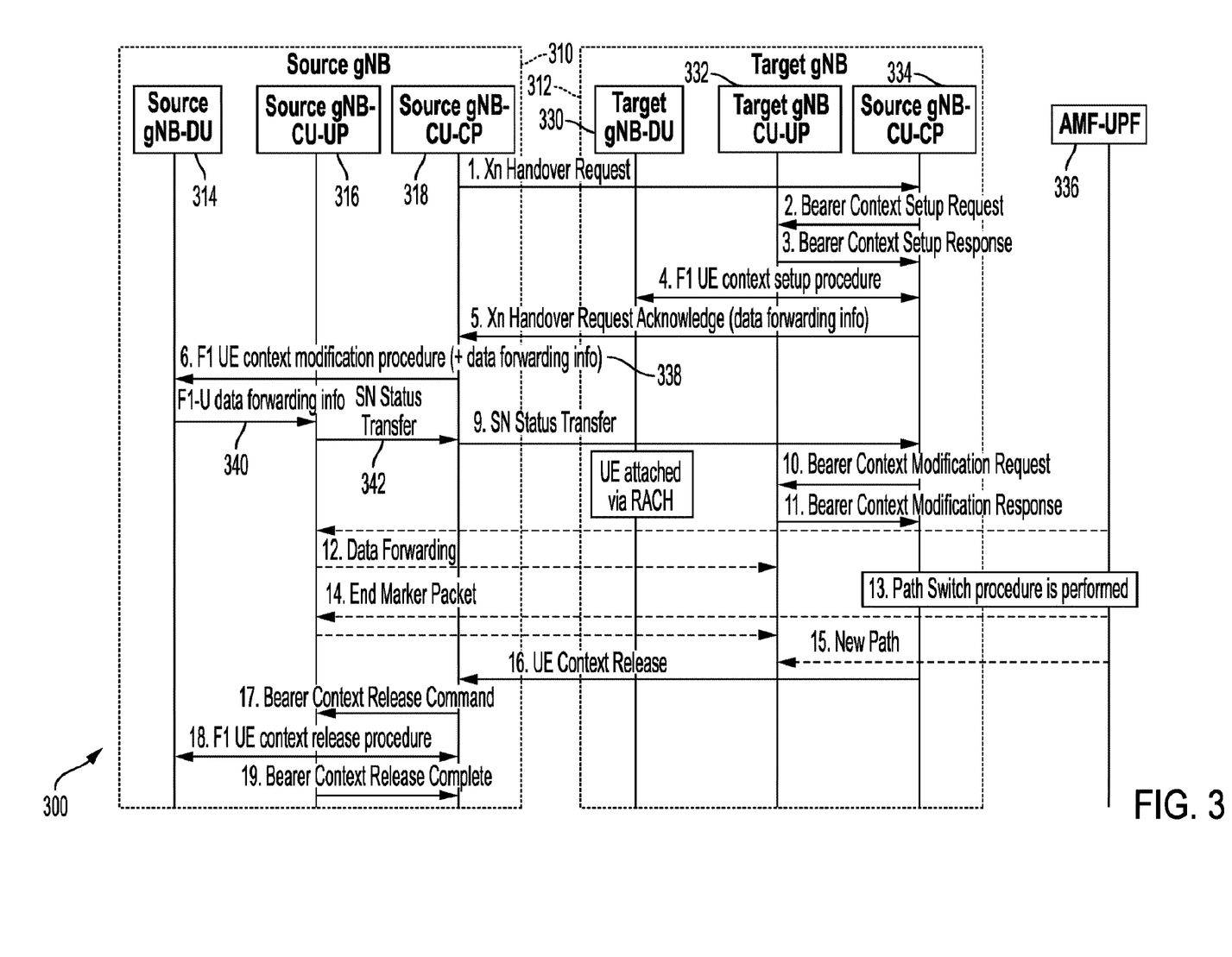
FIG. 3 is a diagram of an Inter-gNB handover involving a gNB-CU-UP change in accordance with one or more embodiments.

Referring now to FIG. 3, a diagram of an Inter-gNB handover involving a gNB-CU-UP change in accordance with one or more embodiments will be discussed. FIG. 3 shows a modified handover procedure 300 for Inter-gNB handover from a source gNB 310 to a target gNB 312 involving a gNB-CU-UP change. The source gNB 310 includes a source gNB-DU 314, a source gNB-CU-UP 316, and a source gNB-CU-CP 318. The target gNB 312 includes a target gNB-DU 330, a target gNB-CU-UP 332, and a target gNB-CU-CP 334. The source gNB 310 and the target gNB 312 are coupled with an Access and Mobility Management Function/User Plane Function (AMF/UPF) 336. The modified procedure 300 transports data forwarding tunneling info per data radio bearer (DRB) and/or per protocol data unit (PDU) session, which are provided from the target gNB 312, to a source gNB-CU-UP 316 via F1-U, thus replacing a complicated Bearer Context Modification procedure by a simpler UP frame for its delivery. By this way, it can achieve DL/UL freezing timing synchronized between the gNB-DU and the gNB-CU-UP at source during handover (HO). On the other hand, some impacts can be necessary on the F1 AP UE Context Modification Request message to transport data forwarding tunneling info associated with an admitted DRB or PDU session toward gNB-DU, and also on E1AP interface from the source gNB-CU-UP 316 to the source gNB-CU-CP 318 for sequence number (SN) Status Transfer procedure.

In the original handover procedure involving a gNB-CU-UP change described in Section 8.9.4 of 3GPP TS 38.401 (see FIG. 8.9.4-1), UL/DL TNL info over X2/Xn-U for data forwarding, which were provided from the target gNB-CU-UP 332, are propagated to the source gNB-CU-UP 316. In response, the source gNB-CU-UP 316 provides UL/DL a packet data convergence protocol (PDCP) preservation status (if any) to the source gNB-CU-CP 318. If those data forwarding info 338 can first go to the source gNB-DU 314 (via operation 6), then once the RRC Reconfiguration message containing HO Command was successfully configured to the UE, the gNB-DU can stop UL delivery, and provide an F1-U frame at operation 340 including those data forwarding TNL addresses provided from the target gNB-CU-UP 332. Once the source gNB-CU-UP 316 receives this F1-U frame including data forwarding tunnel info, the source gNB-CU-UP 316 can know that HO is going on and decide when to stop DL delivery (or may immediately freeze DL delivery if such F1-U frame is DDDS feedback). Once frozen, the UL/DL PDCP preservation status (if any) can be provided back to the source gNB-CU-CP 318 via a class-2 E1AP procedure such as SN Status Transfer operation 342, which can effectively replace the E1AP bearer context modification request and response operations.

The modified handover procedure 300 in FIG. 3 can be implemented in various ways. A new F1-U frame can be defined or an existing DDDS frame can be enhanced to transport data forwarding tunneling info. In some examples, the F1 AP UE Context Modification Request message can be enhanced to provide data forwarding tunneling info associated with an admitted DRB or PDU session toward gNB-DU. In some examples, a new E1-AP class-2 procedure such as SN Status Transfer operation 342 can be defined from gNB-CU-UP to gNB-CU-CP for the delivery of PDCP status preservation info. Furthermore, stage-2 enhancement can be provided.

Figure 4:
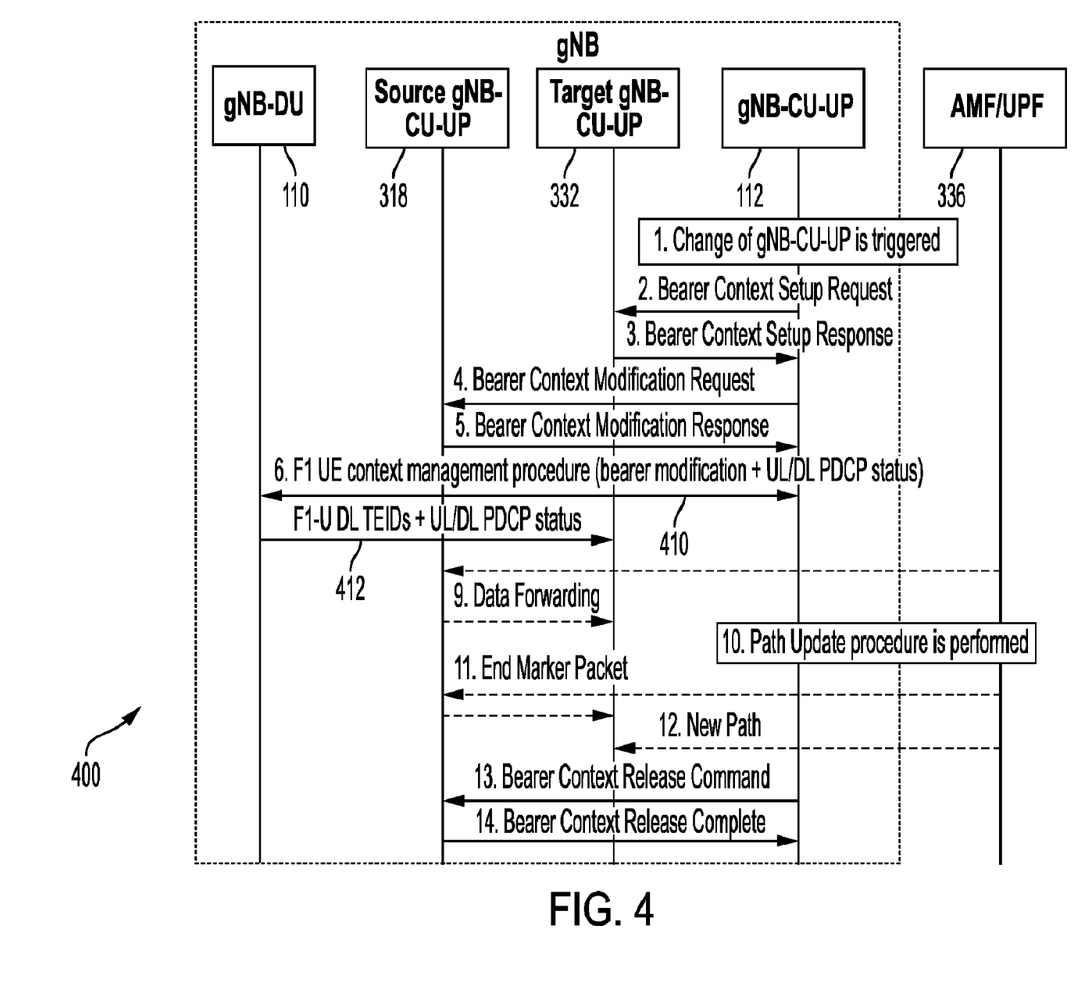
FIG. 4 is a diagram of a change of gNB-CU-UP in accordance with one or more embodiments.

Referring now to FIG. 4, a diagram of a change of gNB-CU-UP in accordance with one or more embodiments will be discussed. FIG. 4 shows a modified procedure 400 for a change of gNB-CU-UP involving transporting UL/DL PDCP preservation status to target gNB-CU-UP 332 via the F1-U interface. The modified procedure replaces a complicated Bearer Context Modification procedure toward the target gNB-CU-UP 332 with a simpler UP frame for the delivery of UL/DL PDCP preservation status info. Some impacts on the F1AP UE Context Modification Request to include those PDCP status associated with a DRB to be forwarded can be involved.

In the original change of gNB-CU-UP procedure described in Section 8.9.5 of 3GPP TS 38.401 (see FIG. 8.9.5-1), UL/DL PDCP status (if any) retrieved from the source gNB-CU-UP 316, together with the modified or established DL F1-U TNLs at gNB-DU 110 (if any), are propagated to the target gNB-CU-UP 332 by the E1AP Bearer Context Modification procedure initiated by the gNB-CU-CP 114. The gNB-DU 110, however, already knows UL F1-U TNL addresses allocated or modified by the target gNB-CU-UP 332 for which it can send an F1-U frame for the successfully established or modified bearers toward the target gNB-CU-UP 332. The UL/DL PDCP status 410 retrieved from the source gNB-CU-UP 316 can also be transported to the gNB-DU 110 during the F1AP UE Context Modification procedure, to be included in the above proposed F1-U frame, so that those can also be propagated to the target gNB-CU-UP 332 directly over F1-U interface together with the modified DL F1-U TNLs at operation 412 as shown in the modified procedure 400.

The above modified change of gNB-CU-UP procedure 400 can be implemented in various ways. The F1AP UE Context Modification Request message can be enhanced to include UL/DL PDCP preservation status associated with a DRB to be setup or modified. In addition to GTP-TEIDs, a new F1-U frame can be defined or an existing DDDS frame can be enhanced to transport UL/DL PDCP preservation status. Furthermore, stage-2 enhancement can be provided.

In one or more embodiments, an enhancement for F1-U: ACK/NACK feedback mechanisms can be provided. The current F1-U does not guarantee lossless delivery, i.e., the receiving entity does not provide ACK/NACK for the received F1-U frames. For delivery of important information such as TNL addresses, there can be an option for the transmitting entity to request ACK/NACK from the receiving entity so that retransmission can happen if not successfully delivered.

The enhancement for F1-U ACK/NACK feedback mechanisms can be implemented in various ways. A new F1-U frame can be defined to indicate that ACK/NACK feedback is required upon reception of this frame. Or an existing F1-U frame can be enhanced with an optional IE to request ACK/NACK feedback from the receiving entity upon reception. Alternatively, it can be configured via a control plane to provide ACK/NACK feedback when receiving F1-U frames. In some examples, a new F1-U frame can be defined or an existing frame can be enhanced to feedback ACK/NACK of a requested frame. To guarantee the validity of ACK/NACK, a specific number or ID can be assigned by the requesting entity for which should be replayed in their response.

Figure 5:
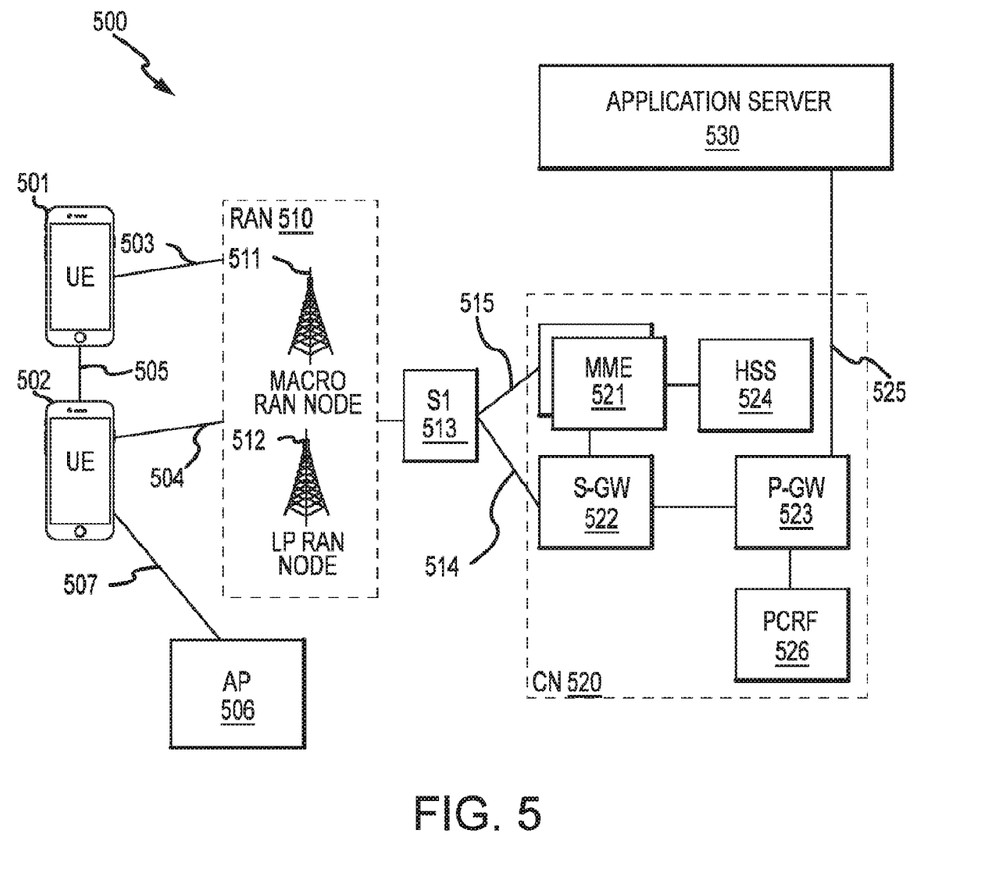
FIG. 5 illustrates an architecture of a system of a network in accordance with some embodiments.

FIG. 5 illustrates an architecture of a system of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network 523 and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voiceover-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
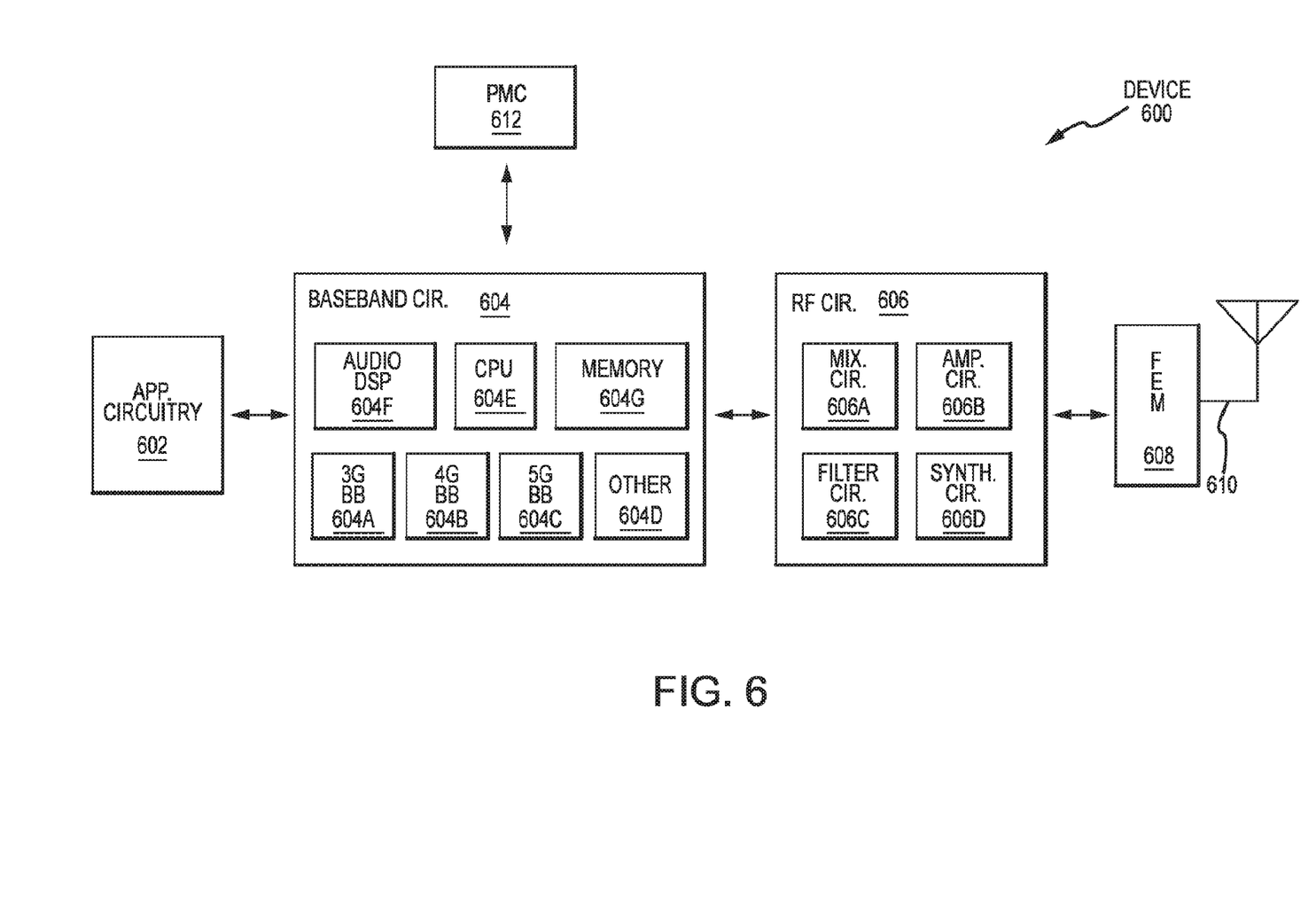
FIG. 6 illustrates example components of a device in accordance with some embodiments.

FIG. 6 illustrates example components of a device in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606*a*, amplifier circuitry 606*b* and filter circuitry 606*c*. In some embodiments, the transmit signal path of the RF circuitry 606 may include filter circuitry 606*c* and mixer circuitry 606*a*. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect. In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage-controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

While FIG. 6 shows the PMC 612 coupled only with the baseband circuitry 604. In other embodiments, however, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

The following are example implementations of the subject matter described herein. A first example can be directed to an apparatus of a next generation NodeB (gNB) comprises one or more baseband processors to interconnect a gNB Central Unit control-plane entity (gNB-CU-CP) with a gNB Central Unit user-plane entity (gNB-CU-UP) via an E1 control plane interface and a gNB Distributed Unit (gNB-DU) via an F1 control plane interface, wherein the one or more baseband processors are configured to establish or modify a bearer context and data transport tunneling for a specific user equipment (UE), and a memory to store the bearer context and data transport tunneling information. A second example can be directed to means or a machine-readable storage that can include means or machine-readable instructions, when executed, to implement a method or realize an apparatus according to the first example.

Although the claimed subject matter has been described with a certain degree of particularity, it should be recognized that elements thereof may be altered by persons skilled in the art without departing from the spirit and/or scope of claimed subject matter. It is believed that the subject matter pertaining to enhancing user plane contexts management in new radio (NR) and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a next generation NodeB (gNB), comprising:
    radio frequency circuitry configured to communicate with a user equipment (UE);
    one or more baseband processors communicatively coupled to the radio frequency circuitry and configured to perform operations comprising:
    interconnecting a gNB Central Unit control-plane entity (gNB-CU-CP) with a gNB Central Unit user-plane entity (gNB-CU-UP) via an E1 control plane interface and a gNB Distributed Unit (gNB-DU) via an F1 control plane interface;
    establishing or modifying a bearer context and data transport tunneling for a specific UE;
    delivering data between the specific UE and a network via an F1 user plane interface between the gNB-CU-UP and the gNB-DU; and
    communicating allocated downlink (DL) or uplink (UL) data transport tunnel info via the F1 user plane interface during a bearer context establishment procedure, during a bearer context modification procedure, or during a radio resource control (RRC) state transition procedure.

2. The apparatus of claim 1, wherein the operations further comprise:
    causing the gNB-DU or the gNB-CU-UP to send confirmation of successful bearer context establishment or successful bearer context modification to the gNB-CU-CP via the F1 control plane interface or the E1 control plane interface during the bearer context establishment procedure, during the bearer context modification procedure, or during the RRC state transition procedure.

3. The apparatus of claim 1, wherein the operations further comprise:
    causing the gNB-DU or the gNB-CU-CP to transport radio resource control (RRC) messages via the F1 control plane interface during an RRC state transition procedure.

4. The apparatus of claim 1, wherein the operations further comprise:
    causing the gNB-CU-CP to transport data forwarding tunnel information or a packet data convergence protocol (PDCP) preservation status information to the gNB-DU via the F1 control plane interface during a bearer context establishment procedure or a bearer context modification procedure for a handover (HO), or during a change of gNB-CU-UP.

5. The apparatus of claim 4, wherein the operations further comprise:
   causing the gNB-DU to transport data forwarding tunnel information or PDCP preservation status info to the gNB-CU-UP via the F1 user plane interface during the bearer context establishment procedure or the bearer context modification procedure for HO, or during the change of gNB-CU-UP.

6. The apparatus of claim 5, wherein the operations further comprise:
   causing the gNB-CU-UP to send PDCP status preservation information, confirmation of successful bearer context establishment, or confirmation of successful bearer context modification to the gNB-CU-CP via the E1 control plane interface during the bearer context establishment or the bearer context modification procedure for HO, or during the change of gNB-CU-UP.

7. The apparatus of claim 1, wherein the operations further comprise:
   causing the F1 user plane interface to utilize a new frame or an optional information element (IE) to request or to receive acknowledgment/negative acknowledgment (ACK/NACK) feedback for lossless delivery of transmitted frames.

8. The apparatus of claim 7, wherein the operations further comprise:
   causing the F1 user plane interface to utilize ACK/NACK validity mechanisms for the feedback requested frames.

9. One or more non-transitory machine-readable media having instructions thereon that, when executed by an apparatus of a next generation NodeB (gNB) result in:
   interconnecting a gNB Central Unit control-plane entity (gNB-CU-CP) with a gNB Central Unit user-plane entity (gNB-CU-UP) via an E1 control plane interface and a gNB Distributed Unit (gNB-DU) via an F1 control plane interface;
   establishing or modifying a bearer context and data transport tunneling for a specific user equipment (UE);
   delivering data between the UE and a network via an F1 user plane interface between the gNB-CU-UP and the gNB-DU; and
   communicating allocated downlink (DL) or uplink (UL) data transport tunnel info via the F1 user plane interface during a bearer context establishment procedure, during a bearer context modification procedure, or during a radio resource control (RRC) state transition procedure.

10. The one or more non-transitory machine-readable media of claim 9, wherein the instructions, when executed, further result in causing the gNB-DU or the gNB-CU-UP to send confirmation of successful bearer context establishment or successful bearer context modification to the gNB-CU-CP via the F1 control plane interface or the E1 control plane interface during the bearer context establishment procedure, during the bearer context modification procedure, or during the RRC state transition procedure.

11. The one or more non-transitory machine-readable media of claim 9, wherein the instructions, when executed, further result in causing the gNB-DU or the gNB-CU-CP to transport radio resource control (RRC) messages via the F1 control plane interface during an RRC state transition procedure.

12. The one or more non-transitory machine-readable media of claim 9, wherein the instructions, when executed, further result in causing the gNB-CU-CP to transport data forwarding tunnel information or a packet data convergence protocol (PDCP) preservation status information to the gNB-DU via the F1 control plane interface during a bearer context establishment procedure or a bearer context modification procedure for a handover (HO), or during a change of gNB-CU-UP.

13. The one or more non-transitory machine-readable media of claim 12, wherein the instructions, when executed, further result in causing the gNB-DU to transport data forwarding tunnel information or PDCP preservation status info to the gNB-CU-UP via the F1 user plane interface during the bearer context establishment procedure or the bearer context modification procedure for HO, or during the change of gNB-CU-UP.

14. The one or more non-transitory machine-readable media of claim 13, wherein the instructions, when executed, further result in causing the gNB-CU-UP to send PDCP status preservation information, confirmation of successful bearer context establishment, or confirmation of successful bearer context modification to the gNB-CU-CP via the E1 control plane interface during the bearer context establishment or the bearer context modification procedure for HO, or during the change of gNB-CU-UP.

15. The one or more non-transitory machine-readable media of claim 9, wherein the instructions, when executed, further result in causing the F1 user plane interface to utilize a new frame or an optional information element (IE) to request or to receive acknowledgment/negative acknowledgment (ACK/NACK) feedback for lossless delivery of transmitted frames.

16. The one or more non-transitory machine-readable media of claim 15, wherein the instructions, when executed, further result in causing the F1 user plane interface to utilize ACK/NACK validity mechanisms for the feedback requested frames.

17. A method performed by a next generation NodeB (gNB), comprising:
   interconnecting a gNB Central Unit control-plane entity (gNB-CU-CP) with a gNB Central Unit user-plane entity (gNB-CU-UP) via an E1 control plane interface and a gNB Distributed Unit (gNB-DU) via an F1 control plane interface;
   establishing or modifying a bearer context and data transport tunneling for a specific UE;
   delivering data between the specific UE and a network via an F1 user plane interface between the gNB-CU-UP and the gNB-DU; and
   communicating allocated downlink (DL) or uplink (UL) data transport tunnel info via the F1 user plane interface during a bearer context establishment procedure, during a bearer context modification procedure, or during a radio resource control (RRC) state transition procedure.

18. The method of claim 17, further comprising:
   causing the gNB-DU or the gNB-CU-UP to send confirmation of successful bearer context establishment or successful bearer context modification to the gNB-CU-CP via the F1 control plane interface or the E1 control plane interface during the bearer context establishment procedure, during the bearer context modification procedure, or during the RRC state transition procedure.

19. The method of claim 17, further comprising:
   causing the gNB-DU or the gNB-CU-CP to transport radio resource control (RRC) messages via the F1 control plane interface during an RRC state transition procedure.

20. The method of claim 17, further comprising:
   causing the gNB-CU-CP to transport data forwarding tunnel information or a packet data convergence protocol (PDCP) preservation status information to the gNB-DU via the F1 control plane interface during a bearer context establishment procedure or a bearer context modification procedure for a handover (HO), or during a change of gNB-CU-UP.

* * * * *